United States Patent [19]

Wanasz et al.

[11] Patent Number: 4,591,763
[45] Date of Patent: May 27, 1986

[54] ELECTRIC GENERATOR SYSTEM FOR PORTABLE FLOODLIGHTING EQUIPMENT

[76] Inventors: Michael J. Wanasz, 8107 S. Yukon Way, Littleton, Colo. 80123; Stanley N. Harrison, 6466 E. Ponderosa Dr., Parker, Colo. 80134; Paul B. McBride, Jr., 1585 Dudley St., No. 5A, Lakewood, Colo. 80215

[21] Appl. No.: 513,295

[22] Filed: Jul. 14, 1983

[51] Int. Cl.⁴ .................. G05F 1/00; H05B 37/02; H05B 39/04; H05B 41/36
[52] U.S. Cl. ................... 315/304; 310/198; 315/288; 315/312; 362/227
[58] Field of Search ............. 315/313, 314, 315, 198, 315/302, 303, 304, 305, 288, 218, 312; 362/229, 228, 227; 310/198, 199, 200; 322/93

[56] References Cited

U.S. PATENT DOCUMENTS

| | | | |
|---|---|---|---|
| 431,216 | 7/1890 | Stanley, Jr. ................... | 310/198 |
| 2,644,911 | 7/1953 | Hultgren ........................ | 315/313 X |
| 3,412,287 | 11/1968 | Hehenkamp ................... | 315/313 X |
| 3,772,565 | 11/1973 | Lenz et al. ..................... | 315/278 |
| 3,912,969 | 10/1975 | Nakai et al. .................... | 315/278 |
| 3,989,339 | 10/1976 | Wroblewski .................... | 315/278 |
| 4,117,390 | 9/1978 | Iwata et al. ..................... | 310/198 |

*Primary Examiner*—Saxfield Chatmon

[57] ABSTRACT

A power supply system for portable floodlighting equipment employing high-intensity electric discharge lamps comprises an alternating current generator having two independent armature windings, one for producing current at a standard voltage and the other for producing current at a voltage sufficiently high for starting a discharge lamp in series with a capacitor. The two windings are out of phase and interference with the operation of the lamps energized by the first winding and electric apparatus energized by the second is effectively eliminated. The use of the generator winding for starting and energizing the lamps eliminates the usual starting ballast and decreases the weight and cost of the portable floodlighting unit.

4 Claims, 3 Drawing Figures

4,591,763

ELECTRIC GENERATOR SYSTEM FOR PORTABLE FLOODLIGHTING EQUIPMENT

This invention relates to alternating current power supplies for floodlighting equipment and the like which employ high-intensity gaseous electric discharge lamps.

Portable floodlighting is employed generally for illuminating construction sites and the outdoor areas of other work and activity. The electric discharge lamp such as the high-intensity metal halide lamp requires a starting voltage substantially higher than the standard 120- and 240-volt domestic power supplies. It is the usual practice to provide transformers or ballasts for this purpose and also capacitors for limiting the lamp current after starting. The ballasts add substantial weight to the equipment, which is particularly undesirable for portable equipment. Portable floodlighting units commonly comprise a trailer carrying an extendable mast on which a plurality of high-intensity electric discharge lamps are mounted and may be raised to elevated positions and an alternating current generator driven by a gasoline or diesel engine. The generator is arranged to provide power for the floodlighting lamps and also for raising the mast and for power tools and other auxiliary electric motor driven equipment.

It is an object of the present invention to provide an improved power generation system for portable floodlighting units.

It is another object of this invention to provide an improved alternating current generator system for supplying power both for the higher voltage starting of gaseous discharge lamps and for auxiliary equipment at standard voltages.

It is another object of this invention to provide an improved electric power system for floodlighting equipment and the like, including a single generator for supplying power at a plurality of different voltages.

It is a further object of this invention to provide an improved and lighter weight power-generating system for portable floodlighting equipment and the like.

It is a further object of this invention to provide an improved alternating current power supply for portable floodlighting units and the like, which requires less space, is lower in cost, and requires fewer components.

SUMMARY OF THE INVENTION

Briefly, the power supply system of this invention, in one embodiment thereof, comprises an alternating current generator having two alternating current supply outlet connections. The generator is provided with two independent sets of windings, each connected to supply a respective one of the outlets. Current is supplied by one set of generator windings at a standard voltage, say 120 volts, and by the other set at a voltage sufficiently high for the starting of an electric discharge lamp, say 530 volts. When a plurality of lamps are employed, each lamp is connected across the 530-volt output. Capacitors, one in series with each respective lamp, act to limit the current flowing through each lamp after starting. The current is supplied at a frequency of 60 Hz and the current of each set of windings is out of phase with that of the other.

DETAILED DESCRIPTION

Figure 1:
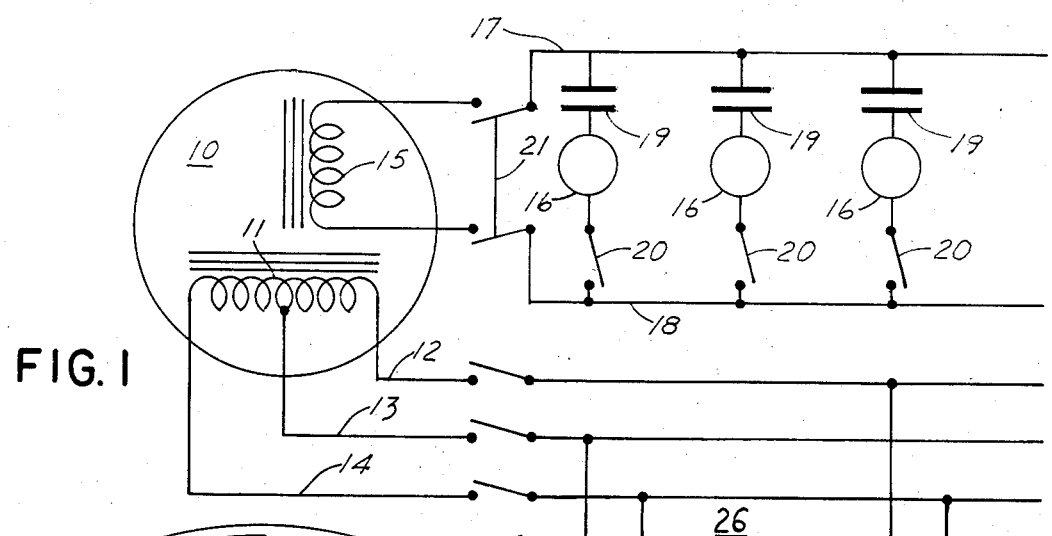
FIG. 1 is a simplified circuit diagram of a power-generating system embodying the invention.

The electric generator system of this invention provides a main generator winding for supplying power to the motors for performing various functions in and around a portable floodlighting unit and a lamp current-supply winding for starting and energizing the high-intensity electric discharge lamps of the unit. This system as shown in FIG. 1 includes an alternating current generator 10 having a stator provided with one winding 11 for supplying power at standard voltage, say 120 and 240 volts, through main lines 12, 13, and 14 and a second and separate winding 15 the coils of which have a sufficient number of turns for supplying power at a higher voltage, say 530 volts for starting and energizing high-intensity discharge lamps 16 through lines 17 and 18. Each of the lamps is connected in series with a capacitor 19 between lines 17 and 18. Individual switches 20 are provided for selectively energizing the lamps, and a manual switch 21 is provided to connect the generator output to the lamp supply lines 17 and 18.

Figure 2:
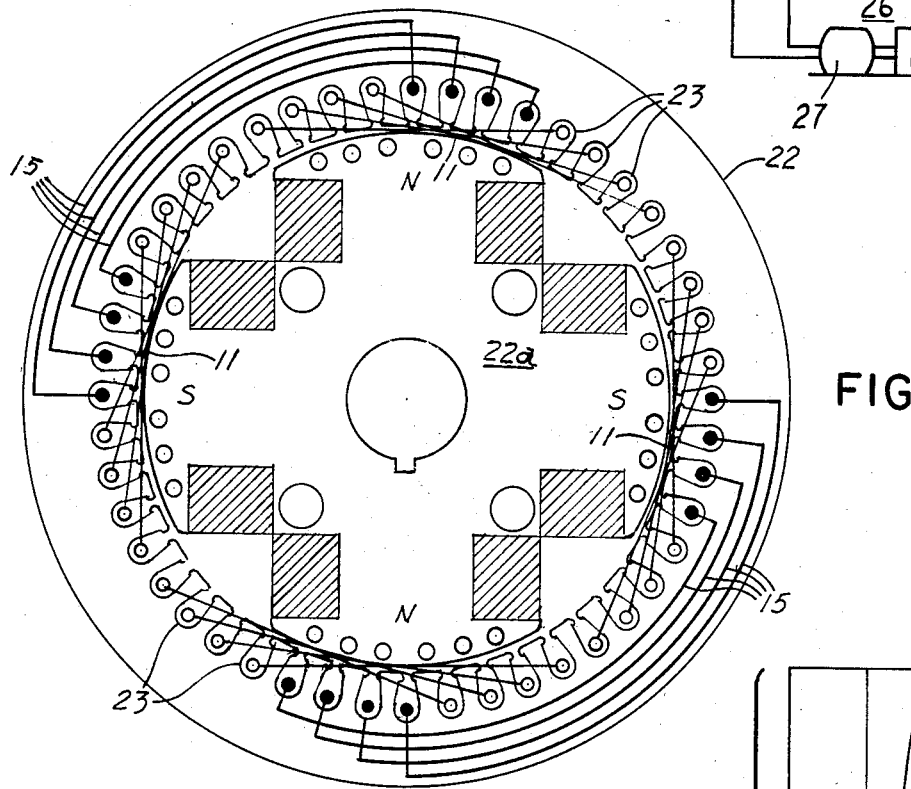
FIG. 2 is a diagrammatic sectional end elevation view of the rotor and stator of a generator for use in the system of FIG. 1.

It has been found that by providing an alternator with two independent sets of windings, standard voltage and higher voltage supplies can be provided and operated to supply separate load systems without objectionable interference with the operation of either system. The armature of a generator suitable for this purpose is illustrated in FIG. 2 in which the armature core, indicated at 22, is provided with forty-eight slots 23 in which the formed multiple-coil windings 11 and 15 are located and are indicated by dashed lines and full lines, respectively, which indicate the relative positions of the windings which are themselves located in the respective ones of the slots 23. Each formed winding is located with its sides in the two slots at the ends of the respective dashed or full line. These dashed and full lines represent the end or return connections between the coils of the windings which have their current-generating sides in the slots. The windings 11 are located in eight pairs of slots 23 in which the sides of the windings are located; and, similarly, the windings 15 are located in four pairs of slots, each slot containing a respective side of a winding. There are two sets of each of the windings 11 and 15 which are indicated in the upper and lower halves, respectively, of the armature as shown in FIG. 2. The armature is used with a rotating field provided by a four-pole rotor 22a having the usual alternate north and south poles. The currents generated in windings on opposite sides of the stator are in phase; and these opposite windings may be connected to the output either in series or in parallel, the series connection being preferred as it provides the higher voltage which is the sum of the voltages of the opposite windings. Thus the standard voltage outputs of the lines 12, 13, and 14 are indicated as connected to two windings in series with a center tap. The terminal connections of the coil ends (not shown) on the opposite side of the stator are made in accordance with the usual series or parallel connections of the windings; the return ends of the individual coils of the windings are, of course, positioned in the usual manner similar to the connections on the near side as shown.

Figure 3:
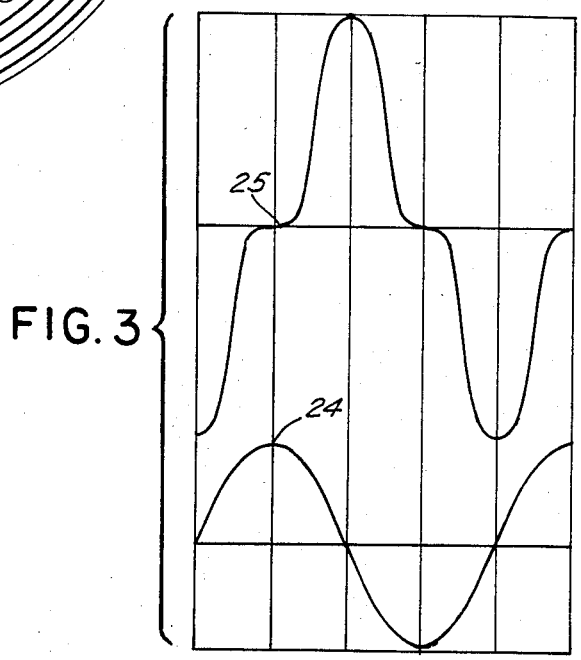
FIG. 3 is a diagram illustrating the wave form and phase relationship of the current flowing in the two circuits.

During operation of the generator, the currents flowing in the two windings 11 and 15 are out of phase. This phase relationship is indicated in FIG. 3 in which the curves of the two windings 11 and 15 are shown in time relationship. When the current in the winding 11 is at a maximum positive peak as indicated by the peak 24, the current in the winding 15 is at zero—as indicated at 25. The two windings are thus ninety degrees out of phase, or in quadrature. With the windings out of phase, the effect of one circuit on the other during changing load condition has been found to be minimal during operation of a floodlighting unit and other electric equipment associated therewith. Further, it is not essential that the phase difference be ninety degrees and substantial variation in the phase difference may be employed for generators in which a relationship other than ninety degrees is desirable for design considerations.

In the operation of a generating system embodying this invention, it was found that high-intensity electric discharge lamps connected to the high-voltage winding operated without interruption or interference during the use of power supplied from the lower voltage windings of the same generator to power tools and other electric motor-driven equipment on the floodlighting unit. The elimination of ballast transformers provided a saving in weight, space, and cost and was afforded without loss in efficiency or in starting performance of the lamps. Furthermore, the starting operation of the lamp or lamps had no noticeable effect on the operation of electric motors energized by the standard or lower voltage windings of the same generator.

We claim:

1. A power-generating system for portable floodlighting equipment and the like including a gaseous electric discharge lamp and auxiliary electric motor-driven apparatus, an engine-driven generator for supplying alternating current to said lamp and to said auxiliary equipment, said generator having a plurality of windings including a first winding connected to said lamp for supplying current at a voltage sufficiently high for starting said lamp and a second winding connected to said motor-driven apparatus for supplying current at a lower voltage for energizing said auxiliary apparatus, said first winding generating alternating current out of phase with respect to the alternating current generated by said second winding, a capacitor connected in series with said first winding and for limiting the current flowing through said circuit when said lamp is conducting, the phase difference between the current flowing in said first winding and that in said second winding decreasing the likelihood of interference with the operation of the load on either winding upon the occurrence of a change of load on the other.

2. A power-generating system as set forth in claim 1 wherein the phase difference between the current generated in said first winding and the current generated in said second winding is ninety degrees.

3. A power-generating system as set forth in claim 1, including at least one additional lamp and capac9itor connected in series therewith and connected in parallel with said first-mentioned lamp and capacitor connected in series.

4. A power-generating system as set forth in claim 3 wherein the phase difference between the current generated in said first winding and the current generated in said second winding is ninety degrees.

* * * * *